United States Patent Office 3,183,114
Patented May 11, 1965

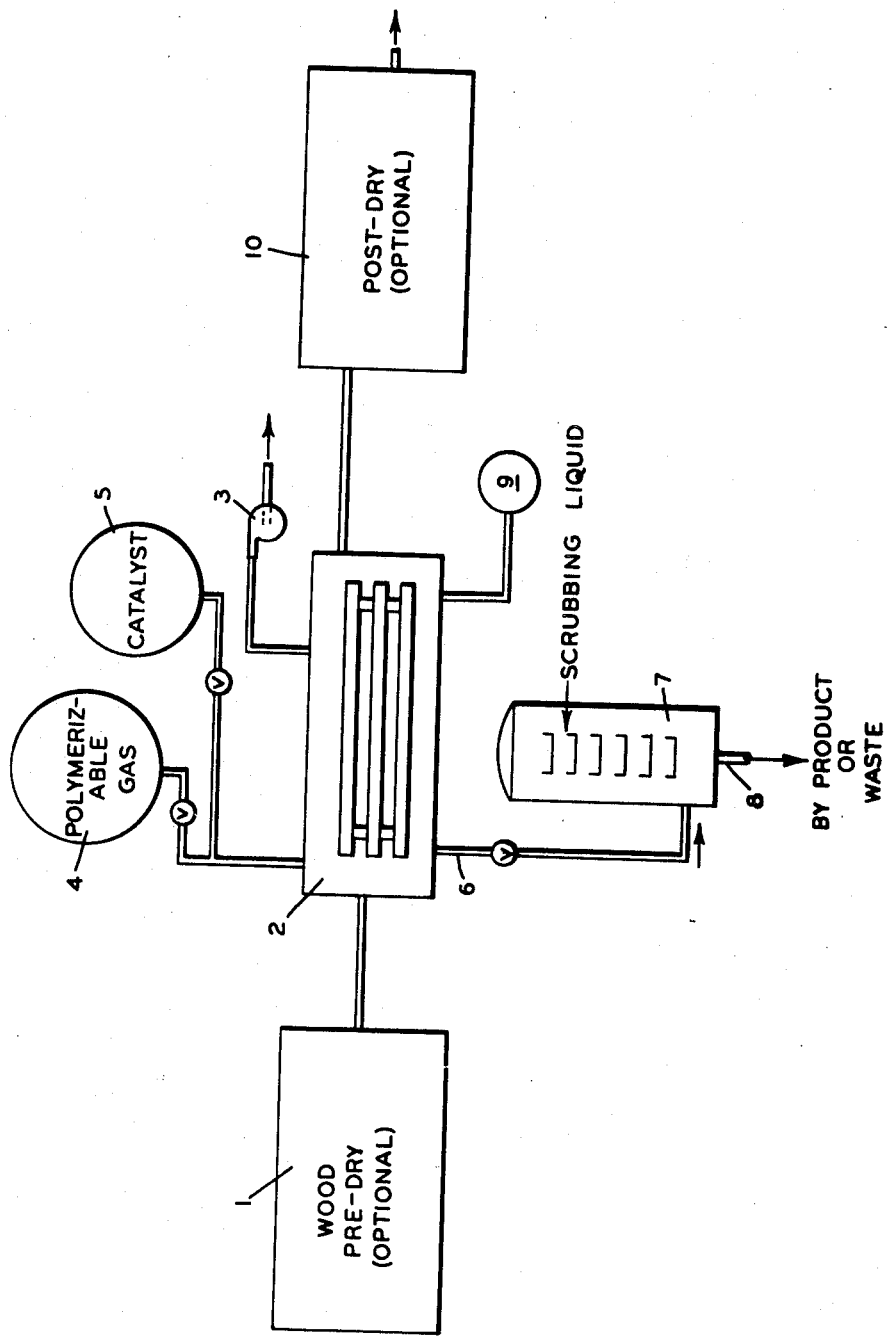

3,183,114
TREATMENT OF WOOD WITH ETHYLENE OXIDE GAS OR PROPYLENE OXIDE GAS
Chien Liu and Charles W. McMillin, Stamford, Conn., assignors to American Machine & Foundry Company, a corporation of New Jersey
Filed Apr. 24, 1961, Ser. No. 104,902
8 Claims. (Cl. 117—62.2)

This invention relates to the chemical treatment of cellulosic materials. More particularly, the invention relates to the treatment of wood, and its derivative materials such as shaped articles of wood or cellulosic composition. In essence, the invention is concerned with minimizing changes in physical dimensions and deterioration of mechanical properties resulting from variations in the moisture content of materials of this kind.

The invention will be described in conjunction with wood with which the invention has preferred application, although the application of the invention, with obvious modifications may be employed in connection with other cellulosic materials as will be apparent to those skilled in the art.

Although wood possesses many unique and desirable properties, its inherent dimensional instability when subject to variations in moisture content seriously limits its usefulness in many current and potential applications. Such defects as open joints, surface checks, end-splits, warpage and many others, are the direct result of dimensional change in the bodies.

All cellulosic materials hold water intimately in the fiber molecules; in the fine capillary structure within the fiber wall; and mechanically in the coarse capillary structure between the fibers and within the cell lumen or fiber cavity.

The shrinkage and swellage of wood refers to changes in the dimensions and volume of wood resulting from variations in its moisture content below the fiber-saturation point. The fiber-saturation point is the condition when all mechanically held free water is evaporated from the cell cavity and from the coarse capillary structure between the fibers, but the cell walls are still fully saturated with bound water intimately held on the fiber structure and in the fine capillary structure. The removal of the free or mechanically held water has no effect upon the properties of the material.

In the drying of cellulosic materials below the fiber-saturation point, the bound water held intimately between the fine structural units, of which cellulosic materials are composed, is removed and these structural units are drawn closer together to occupy or eliminate the void area produced by the removal of this water. This causes the cell wall to be smaller in cross-section and have thinner walls. The cellulosic material can be again swollen with water and the process is reversed in the absorption of water.

Athough several methods of chemically treating wood designed for stabilizing the dimensions of wood and other cellulosic materials have been suggested, most have failed in achieving any real commercial significance. In general, the prior art methods suffer from one or more of the following disadvantages: the process is too cumbersome or time consuming; the process is excessively expensive; the process is substantially ineffective under a wide range of exposure or the treatment imparts undesirable properties to the product.

One known method of treatment consists of soaking water-swollen, green wood in aqueous solution, such as polyethylene glycol. The chemical, to the extent it diffuses into the fine wall cell structural units while the wood is at its maximum expanded dimension, aids in preventing subsequent changes in dimensions with changes in moisture content. Although effective to some extent, the process for soaking wood is inherently slow, requires considerable handling, is not continuous, requires green or water-soaked wood and the use of a relatively expensive chemical in very appreciable quantities. In the expanded wood resulting from this type of treatment, some of the mechanical properties deteriorate considerably. In some cases, surface appearance may also be affected. This further limits the application of the conventional bulking processes.

Treating wood with a vapor phase acid anhydride such as phthalic anhydride or maleic anhydride to obtain an esterification reaction has also been attempted. This process reduces the moisture absorption of wood by partially eliminating hydroxyl groups and cross-linking of wood molecular structure. While the results of this approach may have some merit, the physical structure of wood tends to limit the extent and the effectiveness of this treatment.

According to this invention, wood or its derivative material is treated with a polymerizable gaseous reactant which is converted in situ with the hydroxyl groups of the wood molecular structure or with the intimately held water, with or without catalyst, to form polymerized compounds. As a result of this treatment, the chemically modified wood or its derivative material provides improved dimensional stability and resistance to deterioration.

The process of this invention contemplates further treatment of the product of wood or its derivative material, subjected to treatment of vapor phase polymerizable chemical reactant as described in the previous paragraph, with gas phase acid anhydrides. The acid anhydride reacts with the hydroxyl groups of the polymerized products and of the wood molecular structure to achieve desired esterification and cross-linking. The esterification and cross-linking further improves the dimensional stability and the resistance to deterioration. If the acid anhydride used contains a double bond, such as maleic anhydride, the basis for further chemical linking is provided which is believed to be important for the surface coating application.

In connection with the treatment of wood or its derivative material, the proposed invention is believed to offer the following advantages over the prior art:

(1) As compared to liquid phase treating or bulking, the higher diffusion rates of gas phase polymerizable reactants and catalyst result in a shorter and less costly treatment process.

(2) Ease of handling and adaptability to semi-continuous production.

(3) Wood may be treated under different degrees of moisture content.

(4) As compared with liquid bulking processes, less amount of chemical is required in the process of this invention to attain the same degree of improvement in dimensional stability and deterioration resistance.

(5) As compared with conventional esterification processes, the process of this invention offers considerably greater range of chemical modification. Because of controlled polymerization, the cross-linking can be designed to give desirable properties of the product. This should result in a wider area of application.

It is an object of the present invention to provide a novel, economical, and versatile method for improving the dimensional stability of wood and wood derivative material. It is a further object of the invention to provide a method for reducing moisture absorption in materials of this kind. A further object is to provide materials of this kind which are characterized by desired bulk retention and surface characteristics. Still a further object of the invention resides in increasing the resistance for deterioration of wood and its derivative material. Other objects and advantages will become apparent hereinafter from the description and drawing.

The drawing illustrates schematically a typical procedure for processing material according to the invention.

Specifically, the invention derives a new material from a basis of wood or its derivative materials by chemical modifications, and this new material possesses some of the desirable qualities of both wood and thermosetting plastic materials.

The procedure for carrying out the treatment of wood or its derivative materials will vary considerably with the nature of material to be treated and the desired end result. The selection of gaseous reactants and catalysts, the process condition, the time duration, and the operation sequence, are among the process variables.

A step-by-step treatment procedure which may be employed in practicing the invention will now be discussed in conjunction with the accompanying drawing, wherein, for simplification, wood is employed as the treated stock and ethylene oxide as the treating gas. It will be apparent that with obvious modification other cellulosic materials or articles may be similarly processed.

As shown in the drawing, the wood stock may be optionally predried either separately at 1 or in the chamber 2 to any desired moisture content by a variety of means. Wood material containing the desired amount of moisture is then sealed in pressure chamber 2. The treating chamber is then evacuated with a suitable vacuum apparatus 3 for a period sufficient to remove air in the chamber and in the wood cellular structure. The treating chemical, such as ethylene oxide from a container 4 is introduced in vapor phase to the chamber 2 under suitable pressure, e.g. 20 to 100 lb./sq. in. gage. Optionally, a catalyst material of the kind known to suitably catalyze the polymerizable gas such as trimethylamine or ethylamine in vapor phase is then introduced in the chamber 2 until the pressure is increased slightly, e.g. by about 5 lb./sq. in. to about 35 lb./sq. in. gage. The temperature of the chamber 2 is then preferably increased to about 50° to 100° C. The temperature and pressure in the chamber is maintained for a period of time depending upon the shape, size, and nature of the material being treated and the extent of modification desired. In general, a treatment varying about 15 minutes to 16 hours is adequate for most purposes. Normally, a period of from 2 to 6 hours is employed. The gases are then released and a vacuum applied through line 6 to remove residual vapors contained in the wood and in the chamber 2. The gas evacuated at 6 may be recirculated in total or in part, or, as shown, it may be scrubbed at 7 with a suitable liquid to form a by-product or discharged as a liquid product at 8 and treated optionally as waste. The treated product withdrawn from the chamber 2 is then preferably dried at 10 or optionally, it may be further treated in the chamber 2 so that the polymer formed in situ in the wood is cross-linked with a suitable vapor phase chemical such as maleic anhydride obtained from the vessel 9.

The following examples are presented as further illustrative of the invention. In the examples, modification of the wood is effected with ethylene oxide or propylene oxide to correspondingly form ethylene glycol or propylene glycol either free or grafted to the wood structure. Formation of the glycol is through the vapor phase addition of ethylene oxide or propylene oxide in the presence of a vapor phase catalyst such as trimethylamine. The treated product is then further modified with vapor phase acid anhydrides to effect esterification reactions.

*Example 1*

A wood sample of Douglas fir, 1" x 1" x 4" (4" dimensions along the tangential grain direction) and preconditioned to 5% equilibrium moisture content was placed in an autoclave which was then evacuated to 29 millimeters of mercury for 30 minutes. Ethylene oxide gas was introduced to a pressure of 35 p.s.i.a. The catalyst, trimethylamine, was introduced until a measurable pressure was observed, i.e. to a pressure of about 37 to about 40 p.s.i.a. The temperature of the autoclave was then elevated over a period of three hours from 60° C. to 100° C. in increments of 10° C. as pressures were increased from 40 to 110 p.s.i.a. The gases were then vented from the autoclave followed by evacuation of the autoclave for ½ hour before removal of the wood specimens.

The comparative properties of the treated wood sample and a control are as follows.

|  | Percent |
|---|---|
| (1) Percent Shrinkage (tangential direction):[1] | |
| Treated Sample | 2.7 |
| Untreated Control Sample | 5.9 |
| (2) Percent Gain in Weight of Treated Sample | 2.5 |
| (3) Antishrink efficiency of treated sample over control[2] | 54 |

[1] The shrinkage test comprises measuring the dimensional change from the green to the oven-dry condition and expressing this change as a percentage of the wood's oven-dry dimension.
[2] The difference in percent shrinkage values of treated and untreated wood expressed as a percentage of untreated wood shrinkage, green to over-dry.

*Example 2*

Wood pieces of the type and dimensions of Example 1 preconditioned to 5% equilibrium moisture content were placed in an autoclave and evacuated to 29 millimeters of mercury for 30 minutes. The catalyst, trimethylamine, was then introduced into the autoclave to a partial vapor pressure of 15 p.s.i.a. Ethylene oxide gas was then continuously fed into the autoclave to provide a pressure of 100 p.s.i.a. and the temperature of the autoclave maintained at 100° C. for a period of 2 hours. The gases were then vented from the autoclave, followed by evacuation for ½ hour before removing the specimens.

The comparative properties of the treated wood sample and a control are given as follows.

|  | Percent |
|---|---|
| (1) Percent Shrinkage (tangential direction): | |
| Treated Sample | 1 |
| Untreated control sample | 5.9 |
| (2) Percent weight gain in treated sample | 10 |
| (3) Antishrink efficiency of treated piece over untreated control | 82 |

*Example 3*

Persimmon wood samples (sized as in Example 1), preconditioned to 14% equilibrium moisture content are placed in an autoclave and evacuated to 29 millimeters of mercury for 30 minutes. The catalyst, trimethylamine, was then introduced to a pressure of 25 p.s.i.a. and the temperature of the reactor increased to 60° C. for a period of 1 hour. The trimethylamine vapor was then evacuated to 5 p.s.i.a. Ethylene oxide gas was then introduced into the chamber at a pressure of 70 p.s.i.a. and the temperature maintained at 100° C. for a period of 2 hours. The gases were then removed from the autoclave by evacuation for ½ hour and the specimens removed for examination.

The comparative properties of the treated wood samples and the control sample are given as follows.

|  | Percent |
|---|---|
| (1) Percent Shrinkage (tangential shrinkage direction): | |
| Treated sample | 2.5 |
| Untreated sample | 5.9 |
| (2) Percent weight gain of treated sample | 2.4 |
| (3) Antishrink efficiency of treated sample over untreated control | 74 |

Example 4

A wood sample of hard maple, 2" x 2" x 6", preconditioned to 20% equilibrium moisture content was placed in an autoclave and evacuated to 29 millimeters of mercury for 30 minutes. The reactor was then cooled to 25° C. and the wood first treated with ethylamine at 50 p.s.i.a. at 50° C. for 1 hour. The ethylamine vapor was then evacuated to 10 p.s.i.a. The sample was then treated with propylene oxide at 100° C. at a pressure of 40 p.s.i.a. for 2 hours. The autoclave was then evacuated for ½ hour and the wood sample further treated with maleic anhydride at 4 p.s.i.a. in the presence of pyridine (partial vapor pressure, 1 p.s.i.a.) at 120° C. for 2 hours.

Example 5

Cylindrical samples of Douglas fir, preconditioned to 4% equilibrium moisture content, were placed in an autoclave and evacuated to 29 millimeters of mercury for 30 minutes. Ethylene oxide gas was then introduced to increase the pressure 20 p.s.i.a. The temperature of the autoclave was then increased over a period of 3 hours, from 60° C. to 100° C. in increments of 10° C. at pressures of 55 to 110 p.s.i.a. The autoclave was then evacuated for ½ hour and the wood sample was further treated with maleic anhydride at 4 p.s.i.a. in the presence of pyridine (partial vapor pressure 1 p.s.i.a.) at 120° C. for 2 hours.

It is apparent from the foregoing discussion that the invention affords distinct advantages in the treatment of wood or its derivative material articles in either green or predried condition. The invention offers particular advantages to products in which it is important to provide against dimensional changes occasioned by variability of moisture content resulting in splitting, checking, cracking, etc.

Various changes may be effected in details presented without departing from the spirit of the invention. Accordingly, details herein provided are not to be construed as limitations or restrictions on the invention except as provided in the appended claims.

We claim:

1. The method for enhancing the characteristics of wood which comprises treating said wood under pressure with a vaporous polymerizable compound selected from the group consisting of ethylene oxide and propylene oxide, to form polymerization products in situ in the wood.

2. The method of claim 1 in which the vaporous compound comprises ethylene oxide gas.

3. The method of claim 1 in which the vaporous compound comprises propylene oxide gas.

4. The method for enhancing the characteristics of wood which comprises treating the wood under pressure with a vaporous compound selected from the group consisting of ethylene oxide and propylene oxide, to form a stable polymerization product in situ and further reacting said product with a gas phase acid anhydride cross-linking agent which reacts with the hydroxyl groups in said polymerization product.

5. The method for enhancing the characteristics of wood which comprises treating said wood under pressure with ethylene oxide, to form a non-gaseous, stable polymer in situ in the wood and cross-linking said polymer with a gas phase acid anhydride cross-linking agent which reacts with the hydroxyl groups in said polymerization product.

6. The method for enhancing the characteristics of wood which comprises treating said wood under pressure with propylene oxide, to form a non-gaseous, stable polymer in situ in the wood and cross-linking said polymer with a gas phase acid anhydride cross-linking agent which reacts with the hydroxyl groups in said polymerization product.

7. Wood dimensionally stabilized by having the hydroxyl groups of the molecular structure of said wood chemically combined as a polymer with ethylene oxide.

8. Wood dimensionally stabilized by having the hydroxyl groups of the molecular structure of said wood chemically combined as a polymer with propylene oxide.

References Cited by the Examiner
UNITED STATES PATENTS

| | | | |
|---|---|---|---|
| 1,812,790 | 6/31 | Jaeck et al. | 8—120 |
| 1,942,146 | 1/34 | Kollek et al. | 117—148 |
| 2,045,350 | 6/36 | Griffin et al. | 117—147 |
| 2,302,082 | 11/42 | Whitehead. | |
| 2,417,995 | 3/47 | Stamm et al. | 117—147 |
| 2,548,455 | 4/51 | Walker et al. | 8—116 XR |
| 2,572,070 | 10/51 | Stamm et al. | 117—108 |
| 2,811,470 | 10/57 | Kenaga | 117—147 |
| 2,847,411 | 8/58 | Mitchell et al. | 260—231 |
| 3,032,549 | 5/62 | Mitchell | 260—231 |
| 3,074,833 | 1/63 | Ericks | 8—116 |

OTHER REFERENCES

Golding, B.: "Polymers and Resins," N.Y., Van Nostrand Co., Inc., 1959, pg. 17, TP 156 P 6 G 6.

WILLIAM D. MARTIN, *Primary Examiner.*

MURRAY KATZ, JOSEPH REBOLD, RICHARD D. NEVIUS, *Examiners.*